March 18, 1941.　　　F. SLEZAK　　　2,235,651
MIXING VALVE
Filed Dec. 21, 1937　　　2 Sheets-Sheet 2
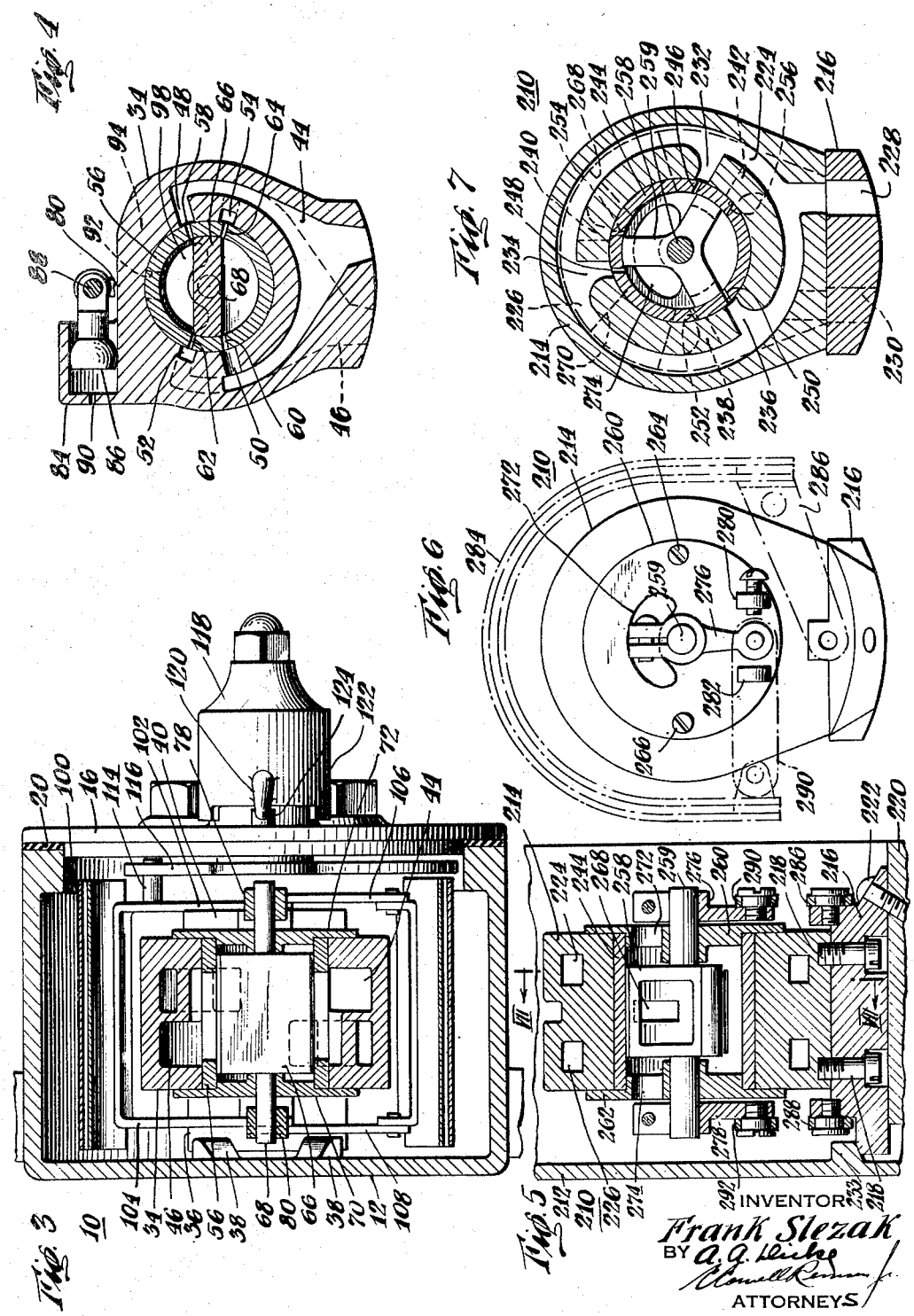
INVENTOR
Frank Slezak
BY
ATTORNEYS Patented Mar. 18, 1941

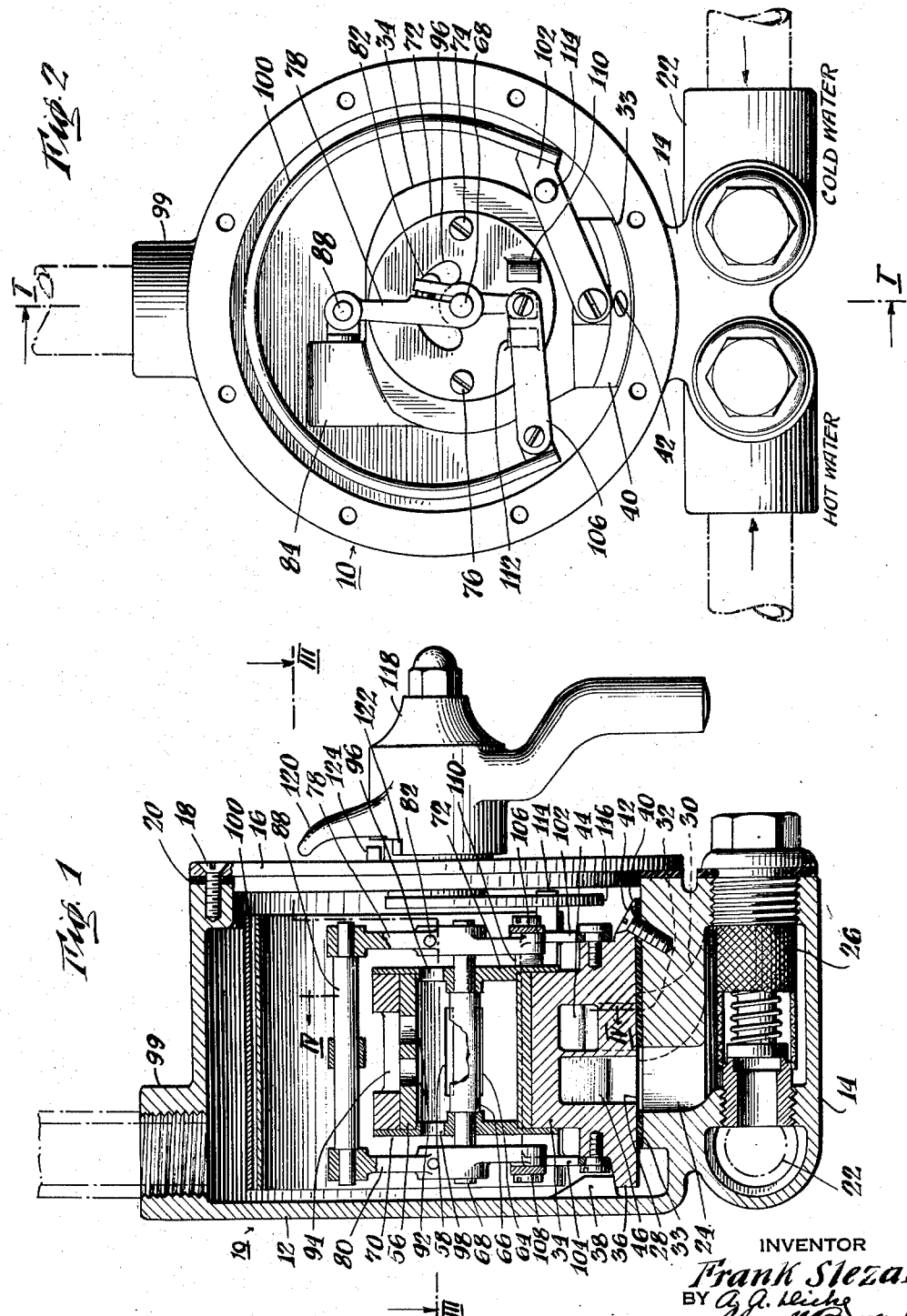

2,235,651

UNITED STATES PATENT OFFICE 2,235,651

MIXING VALVE

Frank Slezak, Maspeth, Long Island, N. Y., assignor to Thermo-Mix, Inc., a corporation of New York Application December 21, 1937, Serial No. 180,923

10 Claims. (Cl. 236—12)

This invention relates to a mixing valve and is more particularly directed to a valve for controllably mixing two fluids of different temperatures to produce automatically a mixture of said fluids at a predetermined or desired temperature.

Accordingly, an object of my invention is the provision of an improved mixing valve.

Another object of my invention is the provision of a mixing valve which is easily controlled and which will readily respond to temperature changes of the mixed fluid.

Still another object of my invention is the provision of a mixing valve which will be substantially unaffected by changes in pressure of the fluid to be mixed.

A further object of my invention is the provision of a mixing valve which, for the same capacity, is lighter in weight than those heretofore known to the art.

A more specific object of my invention is the provision of a mixing valve formed of a relatively small number of parts resulting in ease of operation and construction and facility of assembly.

These and other features, capabilities and advantages of the invention will appear from the following detailed description of one embodiment and a modification thereof, illustrated in the accompanying drawings in which:

Fig. 1 is a side view of my improved valve device, the valve and casing being shown in cross-section along the line I—I of Fig. 2;

Fig. 2 is a front view of my valve construction with the cover and control handle removed;

Fig. 3 is a transverse cross-sectional view taken along the line III—III of Fig. 1;

Fig. 4 is a cross-sectional view of a particular part of the valve construction taken along the line IV—IV of Fig. 1;

Fig. 5 is a cross-sectional view similar to Fig. 1 illustrating a modified form of valve;

Fig. 6 is a front view of the valve shown in Fig. 5; and

Fig. 7 is a cross-sectional view taken along the line VII—VII of Fig. 5.

As illustrated in Figs. 1 to 4 inclusive, my valve generally indicated at 10, is formed of a surrounding casing 12 of generally hollow cylindrical shape open at one side. The casing 12 has preferably formed integrally therewith a base member 14. A cover 16 is used to close the open side of the cylindrical casing and may be attached thereto by suitable means such as screws 18. If desired, an annular ring or gasket 20 of packing material may be inserted between the cover 16 and the main casing body 12.

The base member 14 of the casing 12 is provided with a pair of conduits adapted to be connected to the water or other fluid to be mixed. One of such conduits, which may be the cold water conduit, is indicated at 22 in Fig. 1. Fluid passing from this conduit is adapted to flow upwardly through the passage 24 through a combined check valve and strainer shown at 26. This combined check valve and strainer not only prevent impurities from passing into the valve proper and thereby affecting its operation, but in addition prevents the mixed water from flowing under certain conditions of pressure unbalance back into the supply conduit. While I have indicated that such a combined strainer and check valve or either of these elements may be provided in both of the supply conduits, it is to be understood that this device is not essential to the operation of my improved valve and forms no part of my actual invention.

From the other conduit (not shown) fluid will pass through the other combined check valve and strainer and into the passage 30.

The main operating parts of the valve are situated within the housing 34 of generally cylindrical shape which may be made from a single casting. The housing 34 is adapted to rest upon the base portion 14 of the casing 12. If desired, suitable packing or gasket means 33 may be interposed between. The housing 34 is held in place at one side by a projecting portion 38 integral with the casing 12 which engages an underlying projecting portion 36 of the housing. At the other side a projecting lip 40 is provided integral with the housing 34 and is rigidly attached to the base member 14 by suitable means such as a screw 42. The housing 34 is provided with a pair of parallel semi-annular channels 44 and 46 open at the bottom and communicating with corresponding passages 24 and 30 in the base member 14 through openings 28 and 32.

As is best illustrated in Fig. 4, the channel 44 terminates in two openings 48 and 50, while the channel 46 terminates in two openings 52 and 54.

Positioned centrally within the housing 34 is a cylindrical member 56 which may preferably be pressed-fit therein. The member 56 is provided with slits 58, 60, 62 and 64 which cooperate respectively with openings 48, 50, 52 and 54 to permit passage of fluid within the central portion of the housing. The slits 58, 60, 62 and 64 are substantially smaller in width than the corresponding openings 48, 50, 52 and 54.

For controlling the flow of fluid through the aforesaid slots, a vane 66 is provided. This vane is mounted in a suitable manner to rotate with a shaft 68 which may be journalled in suitable bearings formed with the end members of the housing 70 and 72. Such end members are attached to the housing 34 in any suitable manner illustrated, as by screws 74 and 76. At each end of the shaft 68 there may be attached lever arms shown as 78 and 80. The mode of attachment is unimportant, but may be conveniently brought about by means of a divided section sprung together by means of a screw 82. The vane 66 does not touch the inner bushing 56, but is slightly spaced therefrom. I have found that a spacing of 1/2000 of an inch is satisfactory, but this dimension may be varied within small limits depending upon the materials used and the accuracy of control desired.

In order to dampen the action of my control vane 66, an upraised hollow portion 84 formed integrally with the housing 34, may be provided. Within this hollow portion a piston 86 of suitable design is positioned and loosely journalled at one end upon a shaft 88 which in turn is held in position between the upper ends of the levers 78 and 80. A small hole 90 is placed within the member 84 in order to provide a relatively small escape or entrance for the fluid confined by the piston.

The fluid which flows into a central portion of the housing through the slots escapes into the main valve casing through openings 92 in the bushing 56 and an opening 94 in the housing 34. Fluid may also escape from the ends through openings 96 and 98 in the end members 72 and 70 respectively. By providing these openings in the side members only at the top thereof, a certain amount of pressure is produced by the incoming fluid below the control vane 66 which tends to dampen the action of the control vane and make it less responsive to sudden changes in the pressure of the inflowing fluid. On the other hand, the fluid escaping from the opening in the top will impinge directly upon the bi-metallic control element 100, thus giving a control which is immediately responsive to temperature changes of the mixed fluid. An outlet 99 in the casing 12 leads to a shower or other device using the controlled fluid.

For automatically controlling the temperature of the mixed fluid, I preferably utilize a thermo-responsive device such as a bi-metallic element 100 positioned within the casing 12 and thus subject to the temperature of the mixture. The bi-metallic element 100 is pivoted at one end to the housing 34 by means of links 102 and 104 and at its other end to the lever arms 78 and 80 by means of links 106 and 108. Motion of the thermostat and of the lever 78 is limited by means of stops 110 and 112 preferably, but not necessarily formed integrally with the end member 72. These stops will, as can readily be seen, therefore, limit the motion of the controlling vane 66.

The lever 102 connecting the bi-metallic element to the housing 34 is provided with a pin 114 which engages a slot in a controlling cam 116; the position of this cam is in turn controlled by a handle 118. The latter may be provided with a pointer 120 to show the position of the lever. The handle 118 may also have a cut-out portion 122 cooperating with a stop member 124 on the cover plate 16 to limit the controllable motion.

From the description set forth above, it will be seen that when used, for example, to mix and control hot and cold water to be supplied for a certain use as for example, a shower bath, the two fluids to be mixed will each pass through connecting conduits and channels up through the parallelly positioned semi-annular channels 44 and 46 and, with the control vane in its middle position, into the central portion of the housing 34 out through the openings 92 and 94 and through outlet 99 to the shower or other device. The temperature desired is fixed by rotating the handle 118 and thus fixing the original position of the thermostatic element. If the temperature of the mixture so changes that the thermostatic element will expand or contract from the predetermined normal position, the control vane 66 will then be actuated in one direction or another to admit more or less hot or cold water. The action of the thermostatic element will be dampened by means of the piston 86 acting within the hollow member 84. When this control device is used where extremely hot water is not desired as in shower baths, the vane 66 may be so positioned relative to the slits and stops that no matter what action of the control handle or thermostat may take place, the cold water inlet will never be quite entirely closed. Scalding is prevented by means of such an arrangement.

Attention is directed to the fact, at this time, that while the dampening device indicated as 84, 86, 88 and 90 improves the operation of this valve, such device is not essential thereto and may be omitted if desired.

The modified form of my invention shown in Figs. 5, 6 and 7 differs only slightly from that previously described. In this case the valve is provided with three outlets from each source of fluid as contrasted with only two in the previous case. The valve illustrated in Figs. 5, 6 and 7 is preferably used, where a larger capacity is desired.

The modified form of valve shown in Figs. 5, 6 and 7 is generally indicated at 210. A casing 212 similar in all respects to the casing 12 previously described may be provided. The housing within which the main valve parts are adapted to rotate is, in this form of the invention preferably made of two pieces, 214 and 216, rigidly attached to one another by suitable means such as screws 218. The combined housing is then fastened to the base portion 220 of the casing 212 by means such as screw 222 and at the rear engages a holding lug 223 of the said casing. The housing 214 is provided with two annular channels 224 and 226. The second member 216 forming part of the housing is made with channels 228 and 230 respectively cooperating with the annular channels 224 and 226. The annular channel 224 terminates in a plurality of openings 232, 234 and 236 while the annular channel 226 terminates in openings 238, 240 and 242. Within the central portion of the housing 214 a cylindrical bushing is inserted and may be press-fit therein. The bushing 244 is formed with a plurality of slits indicated at 246, 248, and 250 cooperating with the openings 232, 234 and 236 respectively, while slits 252, 254 and 256 respectively cooperate with openings 238, 240 and 242.

For controlling the flow of fluid through the slits into the central portion of the housing a three-armed control vane 258 is provided, rigidly attached to the shaft 259. The shaft 259 is held in position and journalled in end members 260 and 262 suitably attached to the housing 214, by means such as screws 264 and 266. The fluid which flows into the central portion of the housing and is mixed, flows out therefrom through openings 268 and 270 and impinges upon the bi-metallic element 284 in the casing 212, from whence it will then flow to any place desired. Openings 272 and 274 are also provided in the upper portion of the end members 260 and 262 and the fluid within the central portion of the housing may also flow therethrough. As described above, by having openings in the side members only at the top thereof, the pressure formed within the central portion of the housing tends to balance the controlling vane and thus make it quite unresponsive to sudden changes in pressure of the fluid source. Rigidly attached to each end of the shaft 259 in any suitable manner are arms 276 and 278. The arm 276 is limited in its movement by means of adjustable stop members 280 and 282.

As in the previous example, the control of the valve is effected automatically by means of a bimetallic element here indicated at 284. The element 284 is pivoted to the housing 214 at one end through levers 286 and 288. At its other end, it is interconnected with the levers 276 and 278 by means of links 290 and 292. Expansion and contraction of the thermostatic element will accordingly tend to move the levers 276 and 278 and thus the control vane 258. The setting of the thermostatic element can be brought about by means (not shown) but identical with that previously described with regard to the preferred type of valve structure.

The invention is not intended to be limited to the two forms shown which are to be understood as illustrative only and not as limiting, as various changes in construction and arrangement may be made, all coming within the scope of the claims which follow.

I claim:

1. In a mixing valve having a mixing chamber, a thermo-responsive element therein responsive to the temperature of the mixed fluid and means for controlling the initial set of said thermo-responsive element, in combination, a housing in said mixing chamber having a pair of semi-circular conduits lying in respectively parallel planes, each adapted to be connected to a source of fluid to be mixed, said housing having a central hollow opening about which said conduits extend, and at least one passage from each of said conduits directed inwardly toward said opening, a hollow cylindrical bushing inserted within said central hollow opening and having a tight fit within said housing, said bushing having slits cooperating with said passages, whereby said conduits communicate with said hollow opening through said respective passages and slits, a vane mounted for rotation within said central hollow opening for controlling the passage of fluid through said slits, means for rotating said vane by said thermo-responsive element, and means for permitting flow of the mixed fluid from said central hollow opening to said mixing chamber.

2. The combination according to claim 1 in which each of said parallel conduits extends at least 180° about said central hollow opening and has an inwardly directed passage near each end thereof, said bushing having slits cooperating with all of said passages.

3. The combination according to claim 1 in which each of said parallel conduits extends about said central hollow opening in the form of a hollow annulus and has three equally spaced inwardly directed passages, said bushing having slits cooperating with all of said passages.

4. The combination according to claim 1, in combination with dampening means positioned on said housing and connected to said vane for dampening the action thereof.

5. In combination, a hollow substantially cylindrical housing open at both ends and having a relatively flat integral base portion extending longitudinally along the outer surface of one side of said cylindrical housing, the wall of said cylindrical housing having a pair of conduits therein lying in respectively parallel planes, spaced axially along the axis of the cylindrical housing, and extending at least 180° about the axis of the cylindrical housing, conduits extending through said base member each respectively adapted to be connected to a separate source of fluid and respectively communicating with one of said parallel conduits, a bushing press-fitted within said cylindrical housing and having at least two slits therethrough, a passage from each of said parallel conduits inwardly directed to respectively communicate with one of said slits, a vane, and means for rotatably mounting said vane within said bushing for controlling the flow of fluids from said slits.

6. The combination according to claim 5 in which said bushing and said cylindrical housing have communicating radially directed passages for permitting flow of mixed fluid from the inner portion of said housing.

7. The combination according to claim 5 in which there are two inwardly directed passages from each of said parallel conduits, the passages from one conduit being diametrically opposed to one another and circumferencially spaced from the passages leading from the other conduit, and slits in said bushing cooperating with said passages.

8. The combination according to claim 5 in which there are three equally spaced passages leading from each of said conduits, the passages from one conduit being circumferentially spaced from the passages from the other conduit, slits in said bushing cooperating with siad passages, the controlling vane comprising a three arm spider, each arm being adapted to control the flow of fluid from one slit from each conduit.

9. In a mixing valve having a mixing chamber and a thermo-responsive element therein responsive to the temperature of the mixed fluid, in combination, a housing having a pair of conduits lying in respectively parallel planes, each adapted to be connected to a source of fluid to be mixed, said housing having a central opening about which said conduits extend, open at both ends for communication with said mixing chamber, and at least one passage from each of said conduits directed inwardly toward said opening, a vane mounted for rotation within said opening for controlling the flow of fluid from said passages, and means for rotating said vane by said thermo-responsive element.

10. In a mixing valve, in combination, an integral housing having a pair of conduits lying in respectively parallel planes, each adapted to be connected to a source of fluid to be mixed, said housing having a central opening about which said conduits extend, and at least one passage from each of said conduits directed inwardly toward said opening, a vane mounted for rotation within said opening for controlling the flow of fluid from said said passages, a mixing chamber surrounding said housing and in communication with said central opening, a thermo-responsive element mounted in said mixing chamber and operatively connected with said vane and means for controlling the initial set of said thermo-responsive element.

FRANK SLEZAK.